(12) United States Patent
Hüster et al.

(10) Patent No.: US 9,421,905 B2
(45) Date of Patent: Aug. 23, 2016

(54) METHOD FOR CONTROLLING A MATRIX BEAM HEADLAMP WITH ADAPTIVE LIGHT FUNCTIONS

(71) Applicant: Hella KGaA Hueck & Co., Lippstadt (DE)

(72) Inventors: Christian Hüster, Salzkotten (DE); Jacek Roslak, Paderborn (DE); Udo Venker, Güterlsoh (DE); Carsten Wilks, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 145 days.

(21) Appl. No.: 14/261,811

(22) Filed: Apr. 25, 2014

(65) Prior Publication Data

US 2015/0022083 A1 Jan. 22, 2015

(30) Foreign Application Priority Data

Apr. 26, 2013 (DE) .................. 10 2013 104 277

(51) Int. Cl.
*B60Q 1/14* (2006.01)

(52) U.S. Cl.
CPC ....... *B60Q 1/1423* (2013.01); *B60Q 2300/054* (2013.01); *B60Q 2300/056* (2013.01)

(58) Field of Classification Search
CPC .......... B60Q 1/1423; B60Q 2300/056; B60Q 2300/054
See application file for complete search history.

(56) References Cited

U.S. PATENT DOCUMENTS

| 2008/0123357 | A1* | 5/2008 | Steffel | B60Q 1/2607 362/487 |
| 2011/0267455 | A1* | 11/2011 | Gotz | B60Q 1/085 348/135 |

FOREIGN PATENT DOCUMENTS

| DE | 102007040042 A1 | 2/2009 |
| DE | 102011108384 A1 | 1/2013 |
| EP | 1707438 A1 | 10/2006 |

* cited by examiner

*Primary Examiner* — Elmito Breval
(74) *Attorney, Agent, or Firm* — Husch Blackwell LLP

(57) ABSTRACT

A method for controlling a matrix beam headlamp (M) with adaptive light functions in which using non-glare lighting and/or targeted lighting of objects (O) with segments (S1-Sn) of the light distribution of the matrix beam headlamp (M). Different switch-on and switch-off boundaries are defined for the individual segments (S1-Sn).

10 Claims, 3 Drawing Sheets

METHOD FOR CONTROLLING A MATRIX BEAM HEADLAMP WITH ADAPTIVE LIGHT FUNCTIONS

CROSS REFERENCE

This application claims priority to German Patent Application No. 10 2013 104277.5 filed Apr. 26, 2013, and hereby incorporates this document by reference.

TECHNICAL FIELD OF THE INVENTION

The invention relates to a method for controlling a matrix beam headlamp with a glare-free high-beam function.

Novel light functions, for example, glare-free high beams, can be realized through headlamps equipped with matrix beam, i.e., headlamps whose light distribution is divided into several segments.

To realize these functions, the light distribution can be divided into several segments, for example, through a combination of light sources that are switched on and off or dimmed. Glare-free high beams switch off the segments that cause glare for road-users.

The position of relevant objects (e.g., road-users, traffic signs, etc.) is detected by a sensor, usually, a camera. The non-glare lighting or lighting of the objects with segments of the light distribution of the matrix beam headlamp leads to many switching cycles of the light sources. The switching cycles produce an overall unsteady light pattern. This is especially the case when objects are located in the area of segment boundaries and these segments are switched on and off multiple times.

If a headlamp equipped with matrix beam is used for the glare-free high beam light function, the objects to be protected from glare are not subject to glare by means of switching the light segments. Switching the segments can lead to a fast and large change in the light distribution. A fast, noticeable change in the light distribution is perceived as unpleasant by drivers.

Due to the fixed segment boundaries specified by the geometric and optical design of the matrix beam headlamp, small changes in the object to be protected from glare can also lead to large changes in the light pattern. If these changes occur in a cycle, this can result in a stroboscopic "flickering" of the affected segments.

SUMMARY OF THE INVENTION

Therefore, the problem of the present invention is to disclose a method that eliminates the disadvantages from the prior art. A method shall be disclosed that produces a gain in comfort for the driver and can achieve better acceptance of the light function.

To solve this problem, the invention in connection with the preamble of Claim 1 is characterized in that the method comprises the following step: non-glare lighting and/or targeted lighting of objects with segments of the light distribution of the matrix beam headlamp, wherein different switch-on and switch-off boundaries are defined for the individual segments.

The above problem is further solved with the features of claim 10, namely with a use of a matrix beam headlamp for a corresponding method.

The special advantage of the invention consists in that unnecessary switching cycles of the light sources are avoided and an inconspicuous transition between different light powers is achieved.

To achieve this, different switch-on and switch-off boundaries (hysteresis) are used for each segment. In addition, the light sources are not switched on or off directly, but the light power of the light sources is changed according to a transition function.

In a matrix beam headlamp, the light can be generated by many individual sources and/or divided into segments that can be controlled individually with the help of microprocessors and special software. Thus, different road-users (objects) can be selectively omitted in order to not subject them to glare.

For non-glare lighting, the switch-off boundaries of the individual segments are preferably defined by the spatial boundaries of the individual segments.

In an especially preferred way, for non-glare lighting, the switch-on boundaries of the individual segments are defined by additional boundaries, wherein the additional boundaries are hysteresis boundaries.

Each segment has additional boundaries. The additional boundaries are in the bordering/adjacent segment. The additional boundaries preferably run approximately parallel to the segment boundaries.

The distance between the segment boundaries and the additional boundaries defines hystereses.

A hysteresis characterizes a variably delayed response of an output parameter with respect to the input parameter. Generally formulated, this involves a system response in which the output parameter is defined not just as a function of the independently changing input parameter, but also as a function of the prior state of the output parameter. Thus, for the same input parameter, the system can assume one of several possible states—as a function of the previous history.

According to one preferred embodiment of the invention, the segment is deactivated as soon as an object passes the segment boundary and is located within the lighting area of the segment. The segment is activated as soon as the object passes the additional boundary and has definitely left the segment again. The slight cyclical movement of an object at the upper or lower boundary of a segment thus no longer leads to a constant changing of the switching state of this segment.

The mentioned deactivation or activation of the segments is applicable to the non-glare lighting process.

According to one especially preferred embodiment of the invention, for a lighting process, the segment is activated as soon as an object passes the segment boundary and is located within the lighting area of the segment. The segment is deactivated as soon as the object passes the additional boundary and has definitely left the lighting area of the segment again.

When segments are switched on or off, the light power is changed. Preferably, the change in light power is described by a transition function. For a harmonious response of the light function, the non-glare lighting process/lighting process is realized not directly, but instead according to a corresponding transition function.

In an especially preferred way, the transition function can be configured in form and/or time.

The transition is thus significantly less noticeable for the driver, because the total light output can be changed continuously. The transition function preferably has the form of a linear function, an exponential function, or a polynomial function.

According to the invention, a use of a matrix beam headlamp for the method described above is disclosed with which the comfort can be increased for the driver and better acceptance of the light function can be achieved.

Additional advantages of the invention are given from the other dependent claims.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
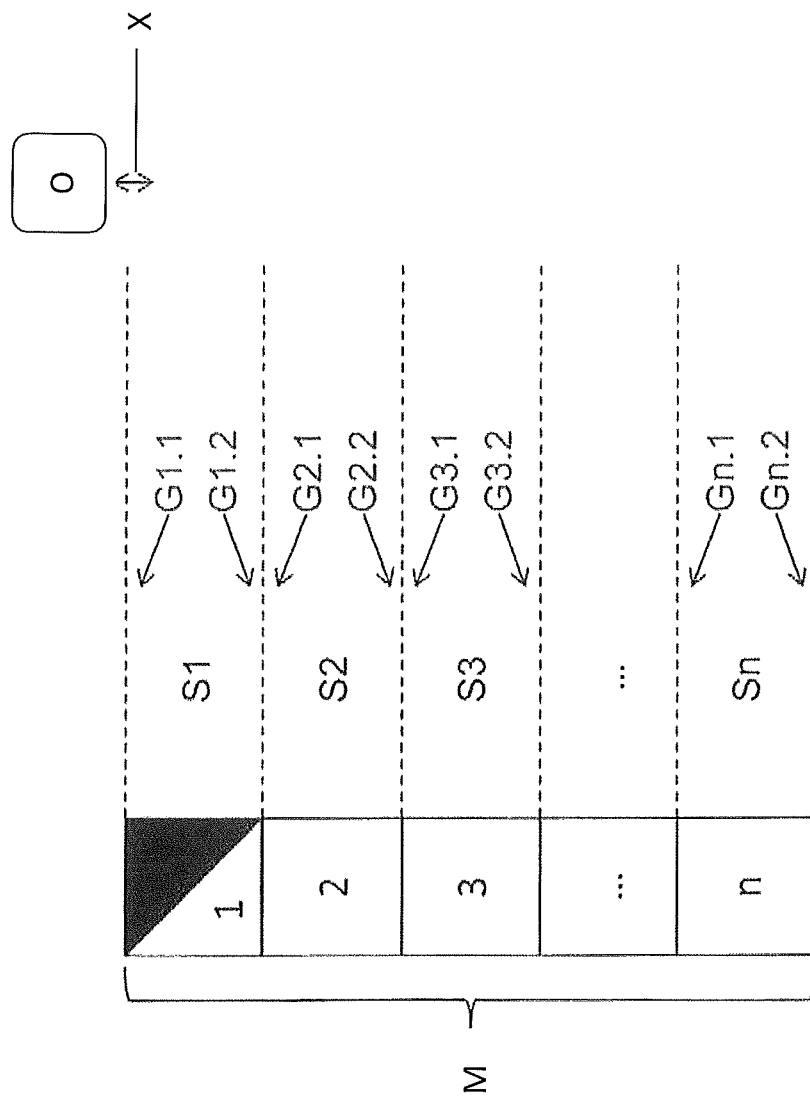
FIG. 1: a diagram with respect to the response of a headlamp known from the prior art and equipped with a matrix beam for a glare-free high beam without hysteresis.

FIG. 1 shows a diagram with respect to the response of a headlamp known from the prior art and equipped with a matrix beam for a glare-free high beam without hysteresis. In this figure: $1-n$=light sources for each segment; S1-Sn=segments of the light distribution; G1.1-Gn.1=upper segment boundaries; G1.2-Gn.2=lower segment boundaries; M=headlamp with matrix beam; and X=object to be protected from glare.

If the function of a glare-free high beam is realized with a matrix beam headlamp, objects are not subject to glare by means of switching the corresponding segments. Which segments are switched is defined by the geometric and optical design of the matrix beam headlamp. If an object moves into the lighting area of a segment, this segment is deactivated.

For the function of a glare-free high beam, the situation can occur that an object to be protected from glare performs a slight movement in the area of the boundaries of the lighting area (e.g., due to sensor inaccuracy/noise).

This movement can cause the situation that a segment must be switched off frequently and might be switched on again. This leads to a frequent changing of the switching state of a segment.

This situation is shown in FIG. 1. The headlamp M comprises a plurality of segments S1-Sn with light sources $1-n$. An object X to be protected from glare carries out a slight, cyclic movement, for example, at the upper boundary G1.1 of the lighting area of a first segment S1 of a headlamp M. The segment S1 is switched in cycles and an area with alternating lighting is produced. This response is perceived as disruptive to the driver.

Figure 2:
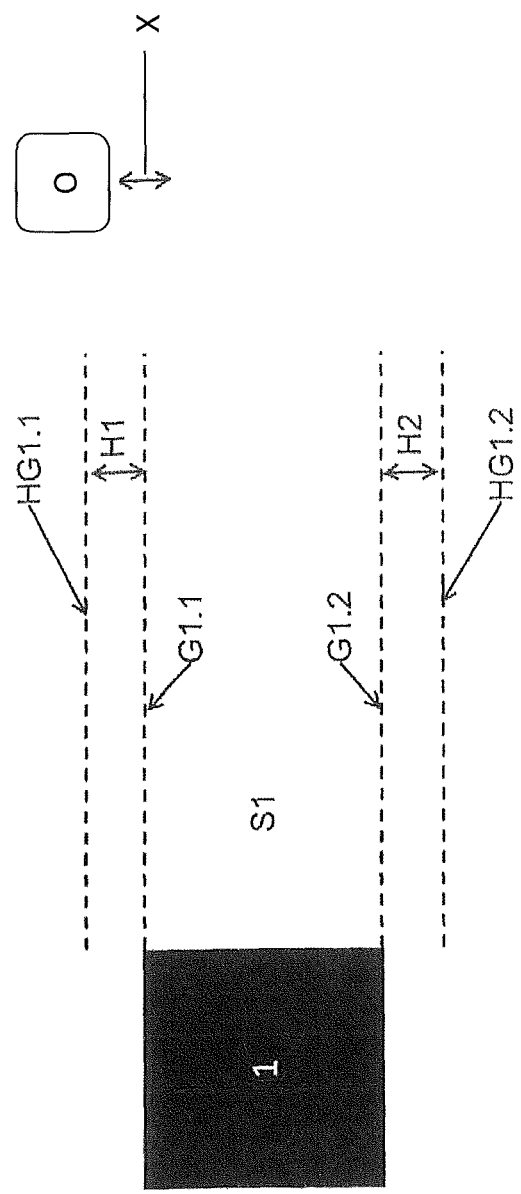
FIG. 2: a diagram with respect to the response of a headlamp equipped with a matrix beam according to the invention for a glare-free high beam with hysteresis.

FIG. 2 shows a diagram with respect to the response of a headlamp equipped with a matrix beam according to the invention for a glare-free high beam with hysteresis. In this figure: 1=light sources for segment; S1=segment of the light distribution; G1.1=upper segment boundary; G1.2=lower segment boundary; HG1.1=upper hysteresis boundary; HG1.2=lower hysteresis boundary; H1=upper hysteresis; H2=lower hysteresis; and X=object to be protected from glare.

The problem formed in FIG. 1 is solved by the use of different boundaries for switching on and off the segments (hysteresis).

FIG. 2 shows the response using the example of a segment S1 of the light distribution with a light source 1. In contrast to FIG. 1, where only the segment boundary G1.1 is evaluated for switching on and off the segment S1, an additional boundary HG1.1 is introduced through the use of a hysteresis H1.

The segment S1 is deactivated as soon as an object X passes the boundary G1.1 or G1.2 and thus is located within the lighting area of the segment S1.

The segment S1 is activated again when the object X passes the boundary HG1.1 or HG1.2 and thus has clearly left the lighting area of the segment S1.

The slight cyclical movement of the object X at the upper boundary G1.1 thus no longer leads to a constant changing of the switching state of the segment S1. The distance between the boundaries is defined by the hysteresis H1 or H2.

Figure 3:
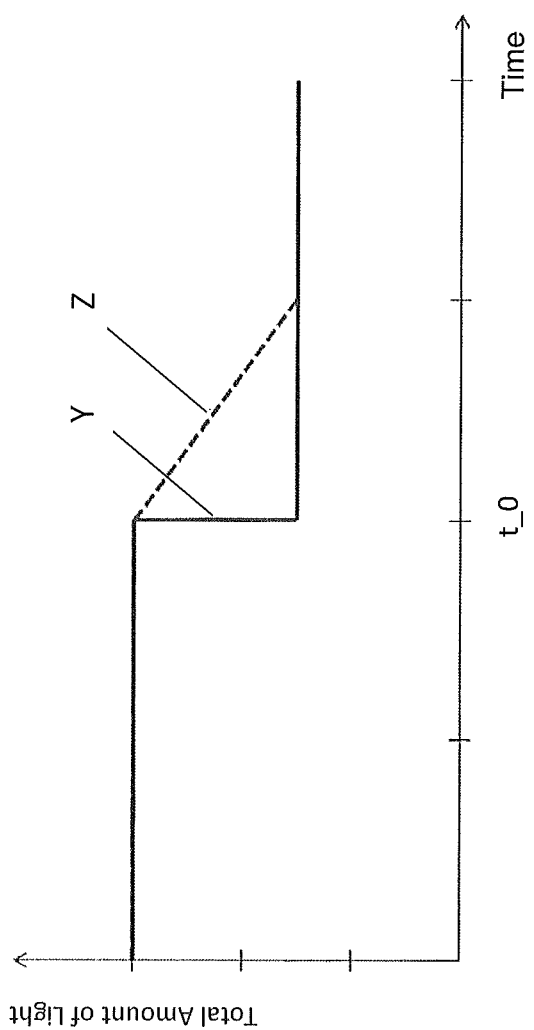
FIG. 3: a time profile of the total light output of a headlamp equipped with a matrix beam for the non-glare lighting of objects.

FIG. 3 shows a time profile of the total light output of a headlamp equipped with a matrix beam for the non-glare lighting of objects. In the graph from FIG. 3, time is plotted on the horizontal axis and the total light output is plotted on the vertical axis.

If the glare-free high beam function is realized with a matrix beam headlamp, objects are not subject to glare by means of activating/deactivating the segments. A direct activation/deactivation of the segments is very noticeable to the driver, because the total light output changes abruptly.

FIG. 3 shows a non-glare lighting process of a matrix beam head lamp. At the point in time $t\_0$, non-glare lighting of an object is carried out. For a harmonious response of the light function, the non-glare lighting process is realized not directly, but instead according to a corresponding transition function. The transition function can be configured in form and time. The transition is significantly less noticeable to the driver, because the total light output changes continuously. The dashed line Z represents a continuous transition between light powers with transition function (configurable in form and time). The solid line Y shows an abrupt transition.

As already mentioned above, in terms of function, evening out the light output from the glare-free high beam with matrix beam headlamps offers the advantage that the function has a significantly more pleasant and harmonious effect.

The preceding explanation of the embodiments describes the present invention only in terms of examples. Obviously, individual features of the embodiments can be combined with each other freely if technically meaningful, without leaving the scope of the present invention.

LIST OF REFERENCE SYMBOLS $1-n$ Light source for the respective segment:
S1-Sn Segments of the light distribution G1.1-Gn.1 Upper segment boundary
G1.2-Gn.2 Lower segment boundary
HG1.1 Upper hysteresis boundary
HG1.2 Lower hysteresis boundary
H1-Hn Hysteresis
H1 Upper hysteresis for segment S1
H2 Lower hysteresis for segment S1
M Headlamp with matrix beam
t_0 Point in time
O Object to be protected from glare
X Direction of movement of the object
Y Abrupt transition
Z Transition with transition function

The invention claimed is:

1. A method for controlling a matrix beam headlamp with adaptive light functions, comprising the step:
    using at least one of non-glare lighting and targeted lighting of objects with segments of the light distribution of the matrix beam headlamp, wherein each segment has switch-off boundaries that are different from its switch-on boundaries, and wherein said switch-off boundaries are defined within said switch-on boundaries for the individual segments.

2. The method according to claim 1, wherein
    the switch-off boundaries of the individual segments are defined by the boundaries of the individual segments, wherein the boundaries are segment boundaries.

3. The method according to claim 1, wherein the switch-on boundaries of the individual segments are defined by additional boundaries, wherein the additional boundaries are hysteresis boundaries.

4. The method according to claim 1, wherein the distance between the segment boundaries and the additional boundaries defines hystereses.

5. The method according to claim 1, wherein
    the segment is deactivated as soon as an object passes the boundary and is located within the lighting area of the segment and
    the segment is activated as soon as the object passes the additional boundary and has definitely left the lighting area of the segment.

6. The method according to claim 1 wherein
    the segment is activated as soon as an object passes the boundary and is located within the lighting area of the segment and
    the segment is deactivated as soon as the object passes the additional boundary and has definitely left the lighting area of the segment.

7. The method according to claim 5, wherein
    a continuous transition of the light power of the matrix beam headlamp takes place between different segments.

8. The method according to claim 7, wherein
    the transition is described by a transition function.

9. The method according to claim 8, wherein
    the transition function can be configured in at least one of form and time.

10. A matrix beam headlamp for use in the method with of claim 1.

* * * * *